US008813195B2

(12) United States Patent
Wen et al.

(10) Patent No.: US 8,813,195 B2
(45) Date of Patent: Aug. 19, 2014

(54) METHOD AND APPARATUS FOR AUTHENTICATING A USER EQUIPMENT

(75) Inventors: Haibo Wen, Shanghai (CN); Fanxiang Bin, Shanghai (CN); Songwei Ma, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 8 days.

(21) Appl. No.: 13/576,488

(22) PCT Filed: Mar. 9, 2010

(86) PCT No.: PCT/CN2010/070942
§ 371 (c)(1),
(2), (4) Date: Aug. 1, 2012

(87) PCT Pub. No.: WO2011/109936
PCT Pub. Date: Sep. 15, 2011

(65) Prior Publication Data
US 2012/0304259 A1 Nov. 29, 2012

(51) Int. Cl.
*H04W 12/06* (2009.01)
(52) U.S. Cl.
USPC .................................... 726/4; 380/270
(58) Field of Classification Search
None
See application file for complete search history.

(56) References Cited

U.S. PATENT DOCUMENTS

2002/0143993 A1* 10/2002 Jung ............................ 709/245
2005/0223413 A1* 10/2005 Duggan et al. .................. 726/3
2005/0255880 A1* 11/2005 Inoue ........................ 455/552.1
2008/0305772 A1 12/2008 Balasubramanian et al.
2009/0129263 A1* 5/2009 Osborn ......................... 370/230
2010/0037284 A1* 2/2010 Sachs ............................. 726/1
2010/0226314 A1 9/2010 Xu
2010/0293250 A1* 11/2010 Ankaiah et al. ............... 709/219

FOREIGN PATENT DOCUMENTS

CN 101400153 A 4/2009
CN 101631309 A 1/2010

OTHER PUBLICATIONS

International Search Report PCT/IS/210 for International Application No. PCT/CN2010/070942 dated Nov. 20, 2010.

* cited by examiner

*Primary Examiner* — Gilberto Barron, Jr
*Assistant Examiner* — David Le
(74) *Attorney, Agent, or Firm* — Harness, Dickey & Pierce, P.L.C.

(57) ABSTRACT

The present invention relates to a Femtocell providing services to a UE, and it proposes a method for authenticating a UE registered in a first operating domain of a communication network (e.g. a mobile core network), when the UE requests the service provided by a second operating domain (e.g. a fixed access network, a backhaul network). An authentication server in the first operating domain allocates the needed information to access the service provided by the second operating domain for the UE, and stores. After receiving the needed information, the UE sends an authentication request message to an authentication server in the second operating domain, wherein the authentication server in the second operating domain forwards the authentication request message to the authentication server in the first operating domain.

12 Claims, 4 Drawing Sheets

METHOD AND APPARATUS FOR AUTHENTICATING A USER EQUIPMENT

FIELD OF THE INVENTION

The present invention relates to providing services across operating domains in communication network, more particularly, to authentication of UE accessing services across operating domains.

BACKGROUND OF THE INVENTION

Femtocell which is called Home NodeB (HNB) or Home eNodeB (HeNB) in 3GPP, has been a hot topic of discussion. It is not only the solution for improving coverage of mobile communication at home, but also a solution to introduce more value-added services, e.g., location-based services, local IP access to residential and enterprise networks.

FIG. 1 depicts a network topology architecture comprising a Femtocell 11, including a residential network 10, a fixed access network 20, and a mobile core network 30. The fixed access network 20 provides a network link for the Femtocell 11 to connect to the mobile core network, which means the fixed access network 20 provides the backhaul for the Femtocell 11 to connect to the mobile core network 30; a User Equipment (UE) 41 connects to the mobile network via Femtocell 11. The Femtocell 11 sets up a secure channel with a Femto Gateway in the mobile core network 30. If the Femtocell 11 does not support LIPA (local IP Access), communications between the UE 41 and apparatus in the fixed access network 20, apparatus in the residential network, and apparatus in the internet(not shown in FIG. 1) have to go through the secure channel to be mobile core network and then be routed to where they should go by the GPRS gateway supported node. If the Femtocell 11 supports LIPA, the UE 41 can communicate with apparatus in residential network directly, while communications with the fixed access network 20 and the internet still have to go through the secure channel and across the mobile core network. Besides, 3GPP is researching how the internet services can be delivered bypassing the Femtocell and go into internet directly via the fixed access network 20, instead of going through the secure channel to the mobile core network.

SUMMARY OF THE INVENTION

Recently IPTV has been widely deployed and used in the fixed operating domain. People can enjoy both live program and VoD program. When the UE is attached to the Femtocell in the home, the users may want to watch the IPTV via their UEs. If UE watches IPTV via the transmitting path existed (arrow curve 51 in FIG. 1), the IPTV traffic is firstly delivered to mobile core network from the fixed access network, then delivered from the Femto GW to the Femtocell via the secure tunnel (shown in FIG. 1), and then to the UE. Obviously the solution will lead to much band resource wasted.

Another possible solution which may be efficient is as follow: IPTV traffic can be delivered to the Femtocell in the residential network via the fixed access network directly, and then delivered to the UE (arrow 61 in FIG. 2). The resulting problem is: since the UE is directly controlled by the mobile network operator, how the fixed access network can trust the UE, which means how the UE can get direct authentication from an authentication server in the fixed access network via Femtocell.

Thus the present invention proposes a method for authenticating the UE registered in a first operating domain of a communication network, when the UE requests the service provided by the second operating domain.

According to a first embodiment of the present invention, there provides a method, in a serving GPRS support node in a first operating domain of a communication network, for authenticating a UE connecting to the communication network via a Femtocell and requesting a service provided by a second operating domain, wherein the UE is a UE of the first operating domain, and the second operating domain provides a backhaul for the Femtocell in the first operating domain, and the method comprises: receiving a first request message from the UE, the first request message requesting to receive a service provided by the second operating domain; verifying whether the UE is authorized to receive the service; and sending a second request message to an authentication server in the first operating domain if the UE is authorized to receive the service, the second request message being used to request the authentication server in the first operating domain to allocate needed information to access the service for the UE.

According to another embodiment of the present invention, there provides a method, in a UE of a communication network, for requesting an access to a service provided by a second operating domain, wherein the second operating domain provides a backhaul for a Femtocell in a first operating domain, the UE is registered to the first operating domain; and the method comprises: sending a first request message to a serving GPRS support node in the first operating domain to request to receive the service; receiving needed information to access the service from the serving GPRS support node; sending an authentication request message to an authentication server in the second operating domain, the authentication request message comprising the needed information; and receiving a second response message from the authentication server in the second operating domain.

According to another embodiment of the present invention, there provides a method, in an authentication server in a second operating domain of a communication network, for authenticating a UE registered to a first operating domain, wherein the second operating domain provides a backhaul for a Femtocell in the first operating domain, the method comprises: receiving an authentication request message from the UE; forwarding the authentication request message to an authentication server in the first operating domain; receiving a first authentication response message from the authentication server in the first operating domain; and sending a second authentication response message to the UE, according to the first authentication response message.

According to another embodiment of the present invention, there provides an apparatus, in a serving GPRS support node in a first operating domain of a communication network, for authenticating a UE connecting to the communication network via a Femtocell and requesting a service provided by a second operating domain, wherein the UE is registered to the first operating domain, and the second operating domain provides a backhaul for the Femtocell in the first operating domain, the apparatus comprises: a first receiving device, for receiving a first request message from the UE to request to receive the service provided by the second operating domain; a verification device, for verifying whether the UE is authorized to receive the service; a first sending device, for sending a second request message to the authentication server in the first operating domain, if the UE is authorized to receive the service, the second request message being used to requesting the authentication server in the first operating domain to allocate the needed information to access the service for UE.

According to another embodiment of the present invention, there provides an apparatus, in a UE of a communication network, for requesting to access a service provided by a second operating domain, wherein the second operating domain provides a backhaul for a Femtocell in a first operating domain, the UE is registered to the first operating domain, the requesting apparatus comprises: a second sending device, for sending a first request message to a serving GPRS support node in the first operating domain, to request to receive the service; a second receiving device, for receiving needed information to access the service from the serving GPRS support node; a third sending device, for sending an authentication request message to an authentication server in the second operating domain, the authentication request message comprising the needed information; and a third receiving device, for receiving a second response message from an authentication server in the second operating domain.

According to another embodiment of the present invention, there provides an apparatus, in an authentication server in a second operating domain of a communication network, for authenticating a UE registered to a first operating domain, the second operating domain provides a backhaul for a Femtocell in the first operating domain, the apparatus comprises: a fourth receiving device, for receiving an authentication request message from the UE; a fourth sending device, for forwarding the authentication request message to an authentication server in the first operating domain; a fifth receiving device, for receiving a first authentication response message from the authentication server in the first operating domain; a fifth sending device, for sending a second authentication response message to the UE, according to the first authentication response message.

According to an another embodiment of the present invention, there provides an apparatus, in an authentication server in a first operating domain of a communication network, for authenticating a UE registered to the first operating domain, wherein a second operating domain provides a backhaul for a Femtocell in the first operating domain, the apparatus comprises: a sixth receiving device, for receiving a second request message from a serving GPRS support node in the first operating domain, the second request message being used to request an authentication server in the first operating domain for allocating needed information to access the service for the UE; an information allocating device, for allocating to the UE the needed information to access the service, storing, and sending the information to the serving GPRS support node; a seventh receiving device, for receiving an authentication request message for authenticating the UE, from an authentication server in the second operating domain, the authentication request message comprising the needed information for the UE to access the service; a comparing device, for comparing the needed information for the UE to access the service in the authentication request information, to the needed information that is stored; and a sixth sending device, for sending an authentication response message to the authentication server in the second operating domain, according to the comparison result.

With the methods and apparatus in this invention, there proposes an efficient solution for UE registered to the first operating domain, requesting services provided by the second operating domain, which makes the following service transmission more efficiently; and helps to introduce more value-added services provided by the second operating domain to UEs registered in the first operating domain, which means providing a new service providing and obtaining mode. In the network topology shown in FIG. 2, the service provided by the fixed access network is directly delivered to UE via Femtocell; UE receives more application; fixed network operators enter Femtocell industry chain; mobile network operators can introduce third party (that is, the fixed access network)services to users as well as reducing their network load via fixed network by bypassing services. It's a triple-win situation.

BRIEF DESCRIPTION OF DRAWINGS

With reference to the following detailed description of the non-restrictive embodiments, other features, objects and advantages of the present invention will be more apparent.

Wherein same or similar reference numerals refer to same or similar apparatuses (modules) or steps.

DETAILED DESCRIPTION OF EMBODIMENTS

Accompanied by the drawings, the following is a description of detailed embodiments of the present invention.

Figure 2:
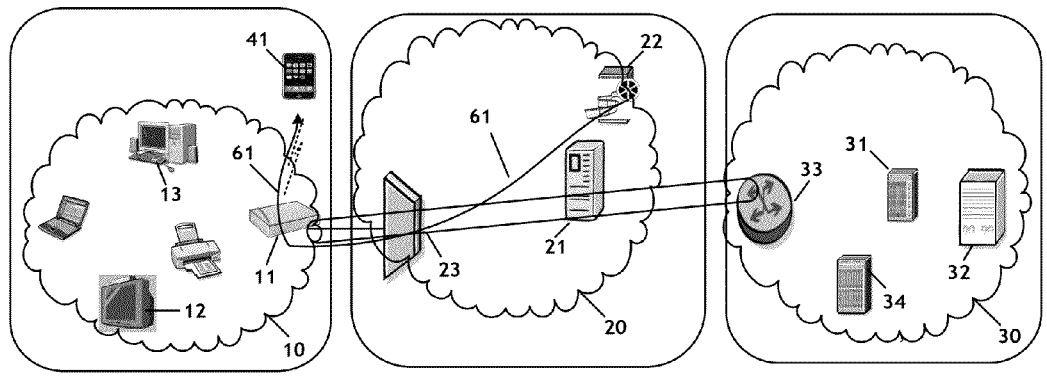
FIG. 2 shows a schematic diagram of an application scenario in the telecommunication system according to one embodiment of the present invention.
Figure 3:
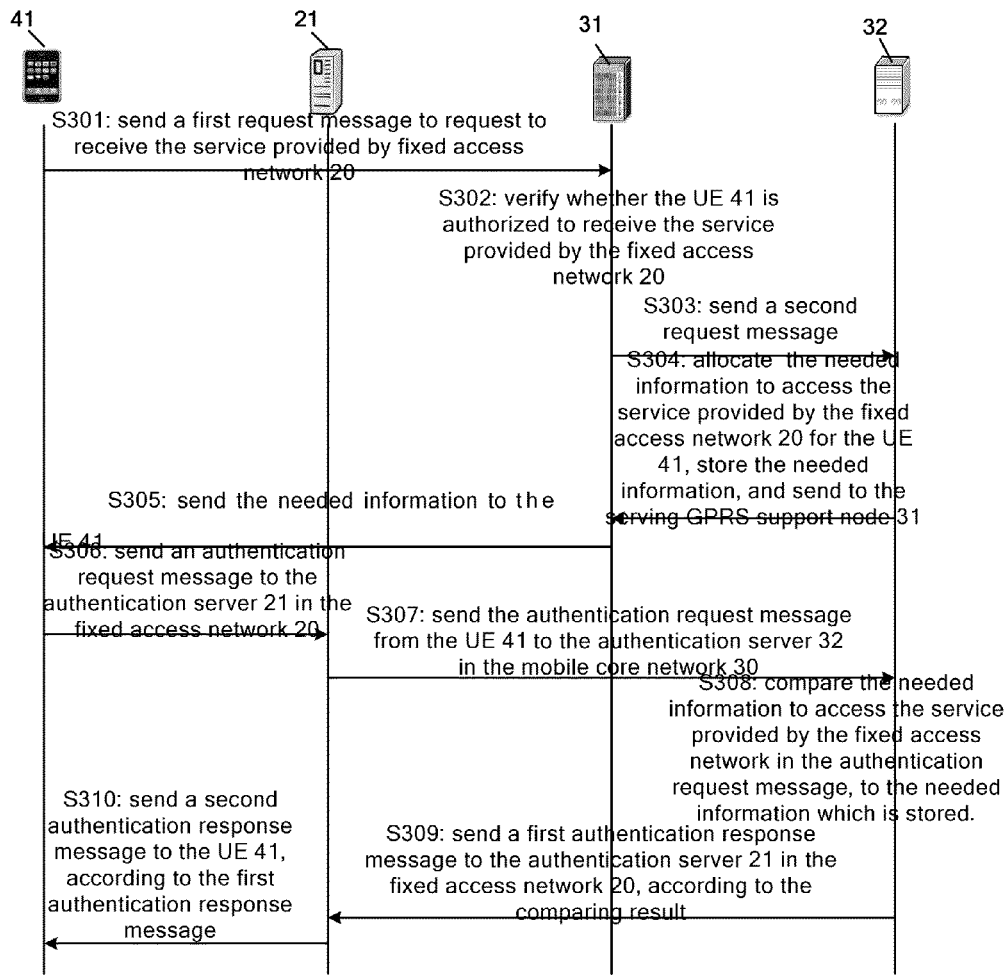
FIG. 3 shows a system flowchart of authenticating UE according to an embodiment of the present invention.

Without loss of generality, in the case of the application scenario shown in FIG. 2, the following is the description of the flow in FIG. 3. In FIG. 2, a residential network 10 comprises a Femtocell 11 and other devices, a television 13, a PC 14, and etc. Generally, a Femto GW function is integrated into the Femtocell 11. Of course, the Femto GW and the Femtocell can be separated physically, and each can be an independent device. The UE 41 is attached to the Femtocell 11 via wireless (of course, the mobile core network controls whether the UE can be attached to Femtocell 11). The fixed network 20 comprises an authentication server 21, IPTV platform 22 (which may comprise at least one server), access node 23 and other network devices. The Mobile core network 30 comprises a serving GPRS support node 31, an authentication server 32, a gateway 33 of the Femtocell 11, a GPRS Gateway Support Node (GGSN) 34 and other network devices.

Figure 1:
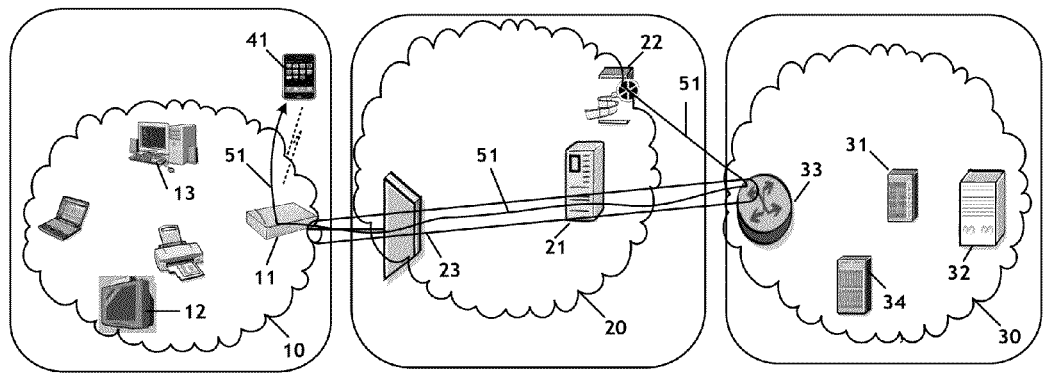
FIG. 1 shows a schematic diagram of an application scenario in the telecommunication system according to one embodiment of the present invention.

It should be noted that, in FIG. 2, the UE 41 and the Femtocell 11 are devices in the mobile network including the mobile core network 30. It should also be noted that, the network topologies shown in FIG. 1 and FIG. 2 are schematic diagrams, which describe network devices related to embodiments in the present invention, while network devices of less relevance to the embodiments are not shown.

FIG. 3 shows a method flowchart, for authenticating the UE connecting to the communication network via the Femtocell and requesting the service provided by the second operating domain, according to an embodiment of the present invention. Wherein the UE is registered to the first operating domain and the second operating domain provides the backhaul for the Femtocell 11 in the first operating domain.

Accompanied by the schematic diagram in FIG. 2, the first operating domain is the mobile core network shown in FIG. 2, and the second operating domain is a fixed access network. It should be noted that, operating domain means the communication networks controlled by operators (e.g. China Mobile, China Unicom, China Telecom, and etc). The second operating domain provides backhauling IP connection for the first operating domain.

Taking the network topology shown in FIG. 2 as an example, the following is the description of the flow in FIG. 3.

First, in step S301, the UE 41 sends a first request message to the serving GPRS support node 31 in the mobile core network, requesting to receive the service provided by the fixed access network 20.

In one embodiment, the format of the first request message is an Activate PDP context Request, and the message comprises an Access Point Name(APN) for receiving the service provided by the fixed access network 20.

Next, in step S302, the serving GPRS support node 31 verifies whether the UE 41 is authorized to receive the service provided by the fixed access network 20. In one embodiment, according to the subscriber Data of the UE 41, serving GPRS support node 31 verifies whether the UE 41 is authorized to receive the service provided by the fixed access network 20. The Subscriber Data of the UE 41 is provided by a Home Location Register (HLR) in the mobile core network 30.

It should be noted that, the service provided by the fixed access network is not limited to IPTV listed above, but including all kinds of services that can be provided by the fixed access network, e.g. VOD, HSI (High Speed Interconnect), online reading and etc.

If the UE 41 is authorized to receive the requested service provided by the fixed access network 20, in step S303, the service GPRS support node 31 sends a second request message to the authentication server 32 in the mobile core network 30, wherein the second request message is used to request the authentication server 32 in the core network 30 to allocate for the UE 41 the needed information to access the service provided by the fixed access network 20. In one embodiment, the needed information comprises an account and/or password, of course, it may also comprise other information related to the service as well, e.g. IPTV server address.

Alternatively, in the first request message received by serving GPRS support node 31 comprises the network address of the Femtocell 11 which the UE 41 is attached to. The network address can be inserted into the first request message during the first request message is forwarded by the Femto GW. Or serving GPRS support node 31 can obtain the network address of the Femtocell 11 in other ways. The network address can be used to authenticate the UE 41 by the authentication server 32 in the mobile core network 30 (it will be described below).

In one embodiment, the format of the second request message can be based on Diameter or RADIUS protocol, wherein the second request message comprises the UE 41's ID, the network address of the Femtocell 11 which the UE 41 is attached to.

In step S304, after receiving the second request message from the serving GPRS support node 31 in the mobile core network 30, the authentication server 32 in the mobile core network 30 allocates the needed information for UE 41 to access the service provided by the fixed access network 20, e.g. an account and/or a password, stores the needed information, and sends it to serving GPRS support node 31. In one embodiment, the authentication server 32 further stores the network address of the Femtocell 11 which the UE 41 is attached to, corresponding to the needed information.

It should be noted that, the needed information can be different according to the services that the UE 41 requests to access. E.g. IPTV may need an account and a password; online reading may need an account only.

In step S305, serving GPRS support node 31 sends the needed information to the UE 41, after receiving it from the authentication server 32 in the mobile core network 30.

In one embodiment, the needed information can be sent to UE 41 in the form of an Activate PDP context Accept message.

Alternatively, before step S305, the serving GPRS support node 31 reserves air interface resource and sets up corresponding Packet Data Protocol Context (PDP Context), for the reception of the requested service provided by the fixed access network 20, after receiving the needed information from the authentication server 32 in the mobile core network 30. In one embodiment, the serving GPRS support node 31 notifies the Femtocell 11 which the UE 41 is attached to, to reserve air interface resource and set up PDP Context, wherein the Packet Data Network (PDN) which the PDP Context indicates is attached to the Femtocell 11 and directly access to the fixed access network instead of a secure channel, while there's no corresponding network address allocated. The network address will be allocated by the IPTV platform (including one or more servers) in the second operating domain. The PDN connection which the PDP Context indicates is the logic GGSN connection from the UE 41 to the Femtocell 11. In this situation, the GGSN function is integrated into the Femtocell 11.

In step S306, after receiving the needed information to access the requested service from the serving GPRS support node, the UE 41 sends an authentication request message to the authentication server 21 in the fixed access network 20, wherein the first authentication request message comprises the needed information to access the service provided by the fixed access network 20.

In one embodiment, as above, if the Subscriber Data of the UE 41 is based on PDP Context, the authentication request message can be implemented by sending a DHCP message via a new PDP context. The needed information to access the service provided by the fixed access network 20 can be put into an option in the DHCP message, or can be put into an EAP authentication extending option in the DHCP message (information about detailed contents of the EAP authentication extending option, can refer to Pruss, R., Zorn, G., Maglione, R., and Y. Li, "EAP Authentication Extensions for the Dynamic Host Configuration Protocol for Broadband". draft-pruss-dhcp-auth-dsl-06. Jun. 10, 2009).

In one embodiment, the access node 23 in the fixed access network 20, e.g. DSLAM, can insert port information into the authentication request message sent by the UE 41, e.g. putting into an option in the DHCP message, for the authentication server 21 in the fixed access network 20 to authenticate the network address of the Femtocell 21 which the UE 41 is attached to. In this situation, the corresponding relationship of the access node port and the network address of the Femtocell is pre-stored in the authentication server 21.

In step S307, the authentication server 21 in the fixed access network 20 sends the authentication request message from the UE 41 to the authentication server 32 in the mobile core network 30.

Alternatively, the authentication server 21 can insert the network address of the Femtocell 11 to the authentication request message, and then send to the authentication server 32 in the mobile core network 30.

In step S308, after receiving the authentication request message from the authentication server 21 in the fixed access network 20, the authentication server 32 in the mobile core network 30 compares the needed information to access the service in the fixed access network for the UE 41 which is included in the authentication request message, with the needed information stored.

Alternatively, in the case that the authentication request message comprises the network address of the Femtocell 11, the authentication server 32 compares the network address corresponding to the needed information stored, with the network address in the authentication request message.

Next, in step S309, the authentication server 32 in the mobile core network 30 sends a first authentication response message to the authentication server 21 in the fixed access network 20, according to the result of comparing. The first authentication response message comprises the result of comparing about whether match occurs. That is, if the comparison result matches, the first authentication response message comprises information of authentication success, if not, the first authentication response message comprises information of authentication failure.

After receiving the first authentication response message, in step S310, the authentication server 21 in the fixed access network 20 sends a second authentication response message to the UE 41, according to the first authentication response message.

In the case that the network address is needed to receive the service provided by fixed access network 21, which is requested by the UE 41, and the first authentication response message comprises the information indicating successful authentication, the second authentication response message comprises a network address allocated for the UE 41. In the case that the fixed access network is a communication network based on IP, the network address is an IP address. Alternatively, in the second authentication response message, a root key may be included, to generate a session key for the UE 41 and the service providing server in the fixed access network.

Next, the UE 41 obtains the service provided by the fixed access network 20, according to the information in the second authentication response message, e.g. the network address allocated, and the root key.

For example, in the case that UE 41 obtains the IPTV service provided by the fixed access network 20, the UE 41 can use the IP address allocated to visit Electronic Program Guide (EPG), and watches IPTV directly via the PDP Context which has already been set up.

Figure 4:
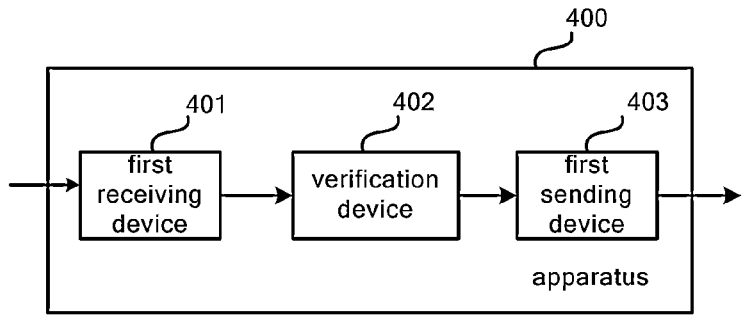
FIG. 4 shows a structure diagram of an authentication apparatus 400 in a serving GPRS support node in the first operating domain in the telecommunication network, for authenticating UE attached to communication network via Femtocell and requesting a service provided by the second operating domain according to an embodiment of the present invention.

FIG. 4 shows a schematic diagram of apparatus 400, in the serving GPRS support node in the first operating domain of a communication network, for authenticating the UE connecting to the communication network via a Femtocell and requesting a service provided by the second operating domain, according to an embodiment of the present invention. Wherein the UE is registered to the first operating domain. In FIG. 4, the apparatus 400 comprises a first receiving device 401, a verification device 402, and a first sending device 403.

Accompanied by FIG. 2, the following is the description of the working process of the apparatus 400 in serving GPRS support node 31. In the present embodiment, the first operating domain is a mobile core network 30, and the second operating domain is a fixed access network 20.

First, the first receiving device 401 receives a first request message from the UE 41 to request to receive the service provided by the second operating domain. In one embodiment, the first request message is an Activate PDP Context Request, including an APN for receiving the service provided by the second operating domain.

Next, the verification device 402 authenticates whether the UE 41 is authorized to receive the service. Finally, if the UE 41 is authorized, the first sending device 403 sends a second request message to the authentication server 32 in the first operating domain, wherein the second request message is used to request the authentication server 32 in the first operating domain to allocate the needed information for UE 41 to access the service. In one embodiment, the second request message comprises the network address of the Femtocell 11 which the UE 41 is attached to. And other information related to the service can be comprised, e.g. the address of IPTV server.

After the authentication server 32 allocating the needed information for UE 41 to access the service, the needed information is sent to the serving GPRS support node 31. In one embodiment, the needed information comprises an account and/or a password.

The first receiving device 401 receives the needed information from the authentication server 32 in the first operating domain. A reserved device (not shown in FIG. 4) reserves air interface resource for the UE 41 and sets up the corresponding PDP Context to receive the service.

Last, the first sending device 403 sends the needed information for the UE 41.

Figure 5:
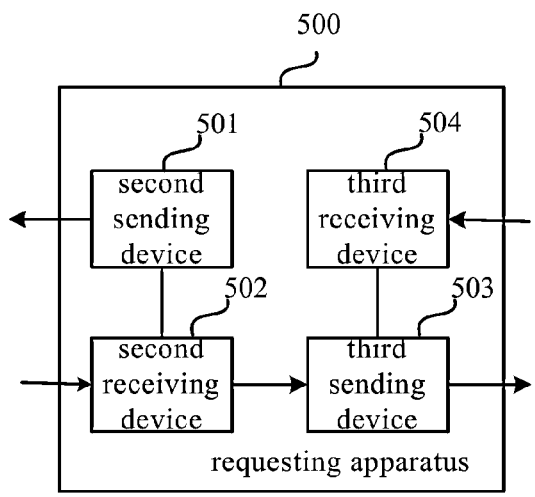
FIG. 5 shows a structure diagram of requesting apparatus 500, in a UE in the communication network, for requesting the service provided by the second operating domain according to an embodiment of the present invention.

FIG. 5 shows a structure diagram of requesting apparatus 500, in a UE of the communication network, for requesting accessing the service provided by the second operating domain, according to an embodiment of the present invention, wherein the UE is registered to the first operating domain, and the second operating domain provides the backhaul for the Femtocell in the first operating domain. In FIG. 5, the requesting apparatus 500 comprises a second sending device 501, a second receiving device 502, a third sending device 503 and a third receiving device 504.

Accompanied by FIG. 2, the following is the description of the working process of requesting apparatus 500 in the UE 41. In the present embodiment, the first operating domain is the mobile core network 30, and the second operating domain is the fixed access network 20.

First, the second sending device 501 sends a first request message to the serving GPRS support node in the first operating domain, to request to receive the service provided by the second operating domain.

Next, the second receiving device 502 receives the needed information to access the service provided by the second operating domain, from the serving GPRS support node 31.

Then, the third sending device 503 sends an authentication request message to the authentication server 21 in the second operating domain, wherein the authentication request message comprises the needed information.

Last, the third receiving device 504 receives a first response message from the authentication server 21 in the second operating domain. In the case that the second operating domain is the fixed access network based on IP, the second authentication response comprises the needed IP address to access the service.

Alternatively, in the second authentication response message, a root key can be included, to generate a session key for the UE 41 and the service providing server in the fixed access network.

Next, the UE 41 obtains the service provided by the fixed access network 20, according to the information in the second authentication response message, e.g. the network address allocated, and the root key.

Figure 6:
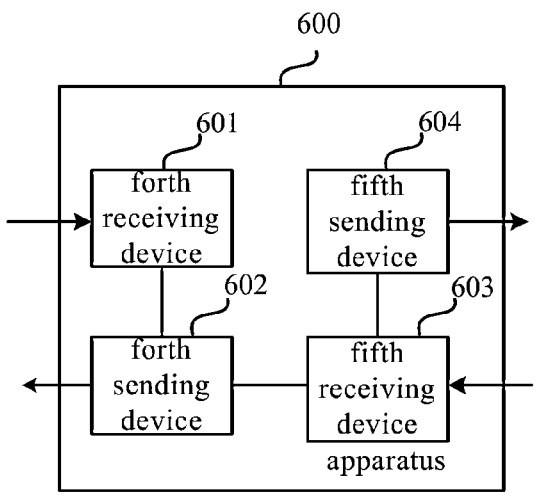
FIG. 6 shows a structure diagram of an apparatus 600, in a authentication server in the second operating domain of communication network, for authenticating UE registered to the first operating domain according to an embodiment of the present invention.

FIG. 6 shows a structure diagram of an authentication apparatus 600, in the authentication server in the second operating domain of a communication network, for authenticating the UE registered to the first operating domain, according to an embodiment of the present invention. Wherein the second operating domain provides the backhaul for the Femtocell in the first operating domain. In FIG. 6, the apparatus 600 comprises a forth receiving device 601, a forth sending device 602, a fifth receiving device 603 and a fifth sending device 604.

Accompanied by FIG. 2, the following is the description of the working process of the apparatus 600 in the authentication server 21. In the present embodiment, the first operating domain is a mobile core network 30, and the second operating domain is a fixed access network 20.

First, the forth receiving device 601 receives an authentication request message from the UE 41.

Next, the forth sending device 602 forwards the authentication request message to the authentication server 21 in the first operating domain.

Then, the fifth receiving device 603 receives a first authentication response message from the authentication server 32 in the first operating domain.

Last, the fifth sending device sends a second authentication response message to the UE 41, according to the first authentication response message. In one embodiment, the second operating domain is a fixed access network based on IP, and the apparatus 600 comprises an allocating device (not shown in FIG. 6), which allocates an IP address for the UE 41, if the first authentication request message comprises information indicating successful authentication, wherein the IP address is included in the second authentication response message.

Figure 7:
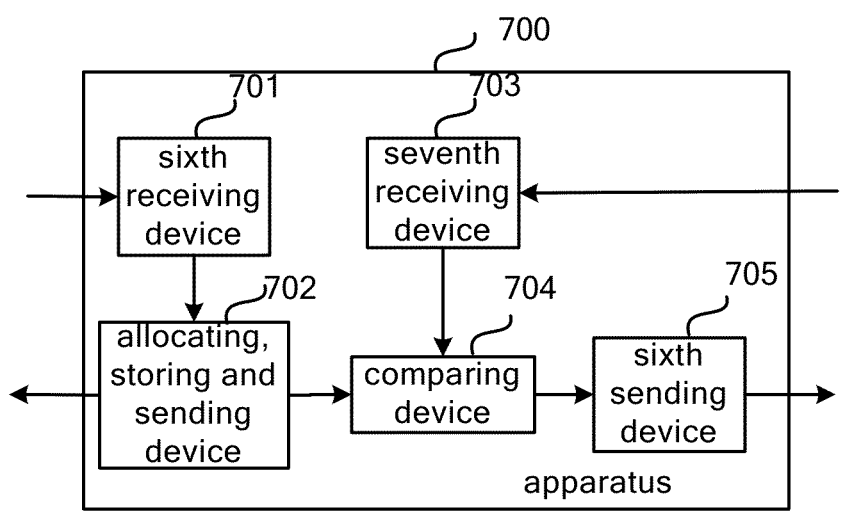
FIG. 7 shows a structure diagram of an apparatus 700, in an authentication server in a first operating domain of communication network, for authenticating a UE registered to the first operating domain according to an embodiment of the present invention.

FIG. 7 shows a structure diagram of authentication apparatus 700, in the authentication server in the first operating domain of communication network, for authenticating UE registered to the first operating domain according to an embodiment of the present invention, wherein the second operating domain provides the backhaul for the Femtocell in the first operating domain. In FIG. 7, the apparatus 700 comprises a sixth receiving device 701, an allocating, storing and sending device 702, a seventh receiving device 703, a comparing device 704 and a sixth sending device 705.

Accompanied by FIG. 2, the following is the description of the working process of apparatus 700 in the authentication server 31. In the present embodiment, the first operating domain is the mobile core network 30, and the second operating domain is the fixed access network 20.

First, the sixth receiving device 701 receives the second request message from the serving GPRS support node 31 in the first operating domain, wherein the second request message is used to request authentication server 31 in the first operating domain for allocating the needed information for UE 41 to access the service provided by the second operating domain.

Next, the allocating, storing and sending device 702 allocates the needed information to access the service for the UE 41, storing, and sending the information to the serving GPRS support node 31.

Then, the seventh receiving device 703 receives an authentication request message of authentication the UE 41, from the authentication server 21 in the second operating domain, wherein the authentication request message comprises the needed information for the UE 41 to access the service.

The comparing device 704 compares the needed information for the UE 41 to access the service in the authentication request information, to the needed information that is stored;

The sixth sending device 705 sends an authentication response message to the authentication server 21 in the second operating domain, according to the comparison result from the comparing device 704.

In one embodiment, the second request message further comprises the network address of the Femtocell 11 which the UE 41 is attached to, and the allocating, storing and sending device 702 stores the network address of the Femtocell 11 with the needed information. The authentication request message received by the seventh receiving device 703 comprises the network address of the Femtocell 11 which the UE 41 is attached to. The comparing device 704 compares the needed information for the UE 41 to access the service and the network address of the Femtocell 11 which the UE 41 is attached to, to the stored needed information and the stored network address of the Femtocell 11 which the UE 41 is attached to. Then, the sixth sending device 705 sends an authentication response message to the authentication server 21 in the second operating domain, according to the comparison result from the comparing device 704.

The above is the description of the embodiments of the present invention. However, any solution not deviating from the spirit of the present invention should fall into the protection scope of the present invention. Besides, any reference numerals in the claims shall not be taken as limiting the claims where they appear. Furthermore it will be apparent that the term "comprise" will not preclude another element(s) or step(s), and the term "a/an" preceding an element will not preclude "a plurality of" such elements. In an apparatus which includes a plurality of devices, one or more functions of the plurality of devices can be implemented with one hardware or software module The terms "first", "second", etc., will be used to represent a name instead of any specific order.

The invention claimed is:

1. A method, in a serving GPRS support node in a first operating domain of a communication network, for authenticating a user equipment (UE) connecting to the communication network via a Femtocell and requesting a service provided by a second operating domain, wherein the second operating domain provides a backhaul for the Femtocell in the first operating domain, the UE is registered to the first operating domain, and the method comprises:

A. receiving, at the serving GPRS support node, a first request message from the UE, the first request message requesting to receive the service provided by the second operating domain;

B. verifying, at the serving GPRS support node, whether the UE is authorized to receive the service; and C. sending, from the GPRS support node, a second request message to an authentication server in the first operating domain, if the UE is authorized to receive the service, the second request message being used to request the authentication server in the first operating domain to allocate needed information to access the service for the UE, the authentication server being configured to independently authenticate mobile devices operating within the first operating domain but not the second operating domain.

2. A method according to claim 1, wherein the method further comprises:
receiving the needed information from the authentication server in the first operating domain;
reserving air interface resource for the UE and setting up a Packet Data Protocol (PDP) context to receive the service;
sending the needed information to the UE.

3. A method according to claim 2, wherein the needed information comprises an account and/or a password.

4. A method according to claim 1, wherein the first operating domain is a mobile communication network, and the second operating domain is a fixed communication network.

5. A method according to claim 1, wherein the second request message further comprises a network address of the Femtocell that the UE is attached to.

6. A method, in an authentication server in a second operating domain of a communication network, for authenticating a user equipment (UE) registered to a first operating domain, wherein the second operating domain provides a backhaul for a Femtocell in the first operating domain, the method comprises:
receiving an authentication request message from the UE;
forwarding the authentication request message to an authentication server in the first operating domain;
receiving a first authentication response message from the authentication server in the first operating domain; and
sending a second authentication response message to the UE, according to the first authentication response message,
the authentication server being configured to independently authenticate mobile devices operating within the second operating domain but not the first operating domain.

7. A method according to claim 6, wherein the second operating domain is an IP-based fixed communication network, the method further comprises:
allocating an IP address for the UE, if the first authentication response message comprises information indicating a successful authentication.

8. A method, in a first authentication server in a first operating domain of a communication network, for authenticating a user equipment (UE) registered to the first operating domain, wherein a second operating domain provides a backhaul for a Femtocell in the first operating domain, the method comprises:
receiving a second request message from a serving GPRS support node in the first operating domain, the second request message being used to request the first authentication server in the first operating domain to allocate needed information to access a service for the UE;
allocating the needed information for accessing the service for the UE, storing the information, and sending the needed information to the serving GPRS support node;
receiving an authentication request message for authenticating the UE from a second authentication server in the second operating domain, the authentication request message comprising the needed information to access the service for the UE;
comparing the needed information to access the service for the UE comprised in the authentication request message to needed information stored;
sending a first authentication response message to the second authentication server in the second operating domain, according to a comparison result,
the first authentication server being configured to independently authenticate mobile devices operating within the first operating domain but not the second operating domain.

9. A method according to claim 8, wherein the second request message further comprises a network address of a Femtocell that the UE is attached to,
the storing step comprises:
storing the network address of the Femtocell with the needed information;
wherein the authentication request message further comprises the network address of the Femtocell that the UE is attached to;
the comparing step comprises:
comparing the needed information to access the service for the UE, and the network address of the Femtocell that the UE is attached to, which are comprised in the authentication request message, to the needed information and the network address of the Femtocell that the UE is attached to, which are stored.

10. An apparatus, in a serving GPRS support node in a first operating domain of a communication network, for authenticating a user equipment (UE) connecting to the communication network via a Femtocell and requesting a service provided by a second operating domain, wherein the second operating domain provides a backhaul for the Femtocell in the first operating domain, and the UE is registered to the first operating domain, the apparatus comprises:
a first receiving device at the serving GPRS support node, for receiving a first request message from the UE to request, the first request message requesting to receive the service provided by the second operating domain;
a verification device at the serving GPRS support node, for verifying whether the UE is authorized to receive the service; and
a first sending device at the serving GPRS support node, for sending a second request message to an authentication server in the first operating domain, if the UE is authorized to receive the service, the second request message being used to request the authentication server in the first operating domain to allocate needed information to access the service for the UE,
the authentication server being configured to independently authenticate mobile devices operating within the first operating domain but not the second operating domain.

11. An apparatus, in an authentication server in a second operating domain of a communication network, for authenticating a user equipment (UE) registered to a first operating domain, the second operating domain provides a backhaul for a Femtocell in the first operating domain, the apparatus comprises:
a fourth receiving device, for receiving an authentication request message from the UE;
a fourth sending device, for forwarding the authentication request message to an authentication server in the first operating domain;
a fifth receiving device, for receiving a first authentication response message from the authentication server in the first operating domain; and
a fifth sending device, for sending a second authentication response message to the UE, according to the first authentication response message, the authentication server being configured to independently authenticate mobile devices operating within the second operating domain but not the first operating domain.

12. An apparatus, in a first authentication server in a first operating domain of a communication network, for authenticating a user equipment (UE) registered to the first operating domain, wherein a second operating domain provides a backhaul for a Femtocell in the first operating domain, the apparatus comprises:
- a sixth receiving device, for receiving a second request message from a serving GPRS support node in the first operating domain, a second request message being used to request the first authentication server in the first operating domain to allocate needed information to access the service for the UE;
- an allocating, storing and sending device, for allocating the needed information to access the service for the UE, storing the information, and sending the needed information to the serving GPRS support node;
- a seventh receiving device, for receiving an authentication request message for authenticating the UE from a second authentication server in the second operating domain, the authentication request message comprising the needed information to access the service for the UE;
- a comparing device, for comparing the needed information for the UE to access the service in the authentication request information, to the needed information that is stored; and
- a sixth sending device, for sending an authentication response message to the second authentication server in the second operating domain, according to the comparison result, the first authentication server being configured to independently authenticate mobile devices operating within the first operating domain but not the second operating domain.

* * * * *